March 14, 1944. W. C. GIBSON 2,344,140
ELECTRO-AUTOMATIC DOCUMENT COLLECTOR AND DISTRIBUTOR
Filed Oct. 9, 1941 4 Sheets-Sheet 1

INVENTOR
William C. Gibson
By His Attorney
Eugene E. Stevens

March 14, 1944.  W. C. GIBSON  2,344,140
ELECTRO-AUTOMATIC DOCUMENT COLLECTOR AND DISTRIBUTOR
Filed Oct. 9, 1941  4 Sheets-Sheet 2

INVENTOR
William C. Gibson
By His Attorney
Eugene E. Stevens

March 14, 1944.　　　W. C. GIBSON　　　2,344,140
ELECTRO-AUTOMATIC DOCUMENT COLLECTOR AND DISTRIBUTOR
Filed Oct. 9, 1941　　　4 Sheets-Sheet 3

INVENTOR
William C. Gibson
By His Attorney
Eugene E. Stevens

March 14, 1944. W. C. GIBSON 2,344,140
ELECTRO-AUTOMATIC DOCUMENT COLLECTOR AND DISTRIBUTOR
Filed Oct. 9, 1941 4 Sheets-Sheet 4

INVENTOR
WILLIAM C. GIBSON

BY HIS ATTORNEY
Eugene B. Stevens

Patented Mar. 14, 1944

2,344,140

UNITED STATES PATENT OFFICE 2,344,140

ELECTROAUTOMATIC DOCUMENT COLLECTOR AND DISTRIBUTOR

William C. Gibson, O'Bannon, Ky.

Application October 9, 1941, Serial No. 414,376

3 Claims. (Cl. 186—22)

My invention relates to new and useful improvements in devices designed to operate electrically on an endless railway suspended from the ceiling of a room of from any desirable special structure therefor, which may not interfere with the normal traffic of the room, and adapted in combination with coacting appurtenances electrically operative, to collect and distribute automatically various documents and packages from and to a central station and from and to other designated, individual stations along the course of said railway.

But my invention relates more particularly to improvements in my co-pending application bearing the Serial No. 324,737, filed March 18, 1940, and patented December 9, 1941, as Patent No. 2,265,478.

One of the objects of my present invention is to simplify the elevating mechanism and its coacting parts operating in my co-pending application at the elevating posts at the various individual stations along the course of said railway. Another object of my instant invention is the simplification of the structure and the suspension of my former monorail and the operative electric circuit thereon. And another object of my new and useful improvements is to render more efficient my former pick-off and release channels on said posts and on the carrier-cars in which I have also made other improvements. In my present invention I have also designed new improvements in my central station equipment and in my former document-carriers. Other detail objects of my present invention will be disclosed in the process of this specification.

The foregoing objects have been efficiently attained in my instant invention, and my new and useful improvements in my Electro-automatic document collector and distributor for offices and sales-rooms, illustrated in the accompanying drawings forming a part of this specification, is a practical device embodying the aforesaid novel means and other new and useful details of constructions, arrangement and combination of parts, all of which with their functions, will be described in detail with reference to said drawings, and will be definitely pointed out in the claims that follow this description, so that any person skilled in the art may be able to construct and use this invention.

In said drawings.

Fig. 2' is an end view in elevation of the rotary drum designed for carrying the two flat steel bands which, at the elevator-posts, serve to carry the pick-off and release channels at the stations for collecting and delivering documents.

Fig. 18' is a sectional view in elevation of the reversing switch-box shown in Fig. 18 cut across in a plane in front of the fiber tumbler yoke which swings alternately between the solenoids C and D, swinging always towards the solenoid that is energized. In this Fig. 18' are shown the two helical springs that support said tumbler yoke in its operation, holding said yoke in its tumbled position until it is tumbled into its alternate position.

These new and useful improvements over my previous invention have been recently designed and experimentally developed in their details of construction for the purpose of producing at a low cost a durable, useful and efficient electro-automatic document-collector-and-distributor for general use in large offices and sales-rooms and in other apartments where it would be convenient for letters and papers to be automatically collected and distributed. And with said purpose and the special objects aforesaid in view, I will now describe my invention more fully in detail, pointing out the new and useful features of the construction and the operation of these new individual parts and the combinations thereof, as illustrated in the drawings hereinabove described, in which similar letters and characters refer to similar parts, throughout the several views.

Figures 1, 2, 3, 4, 5, 6, 7, 8:
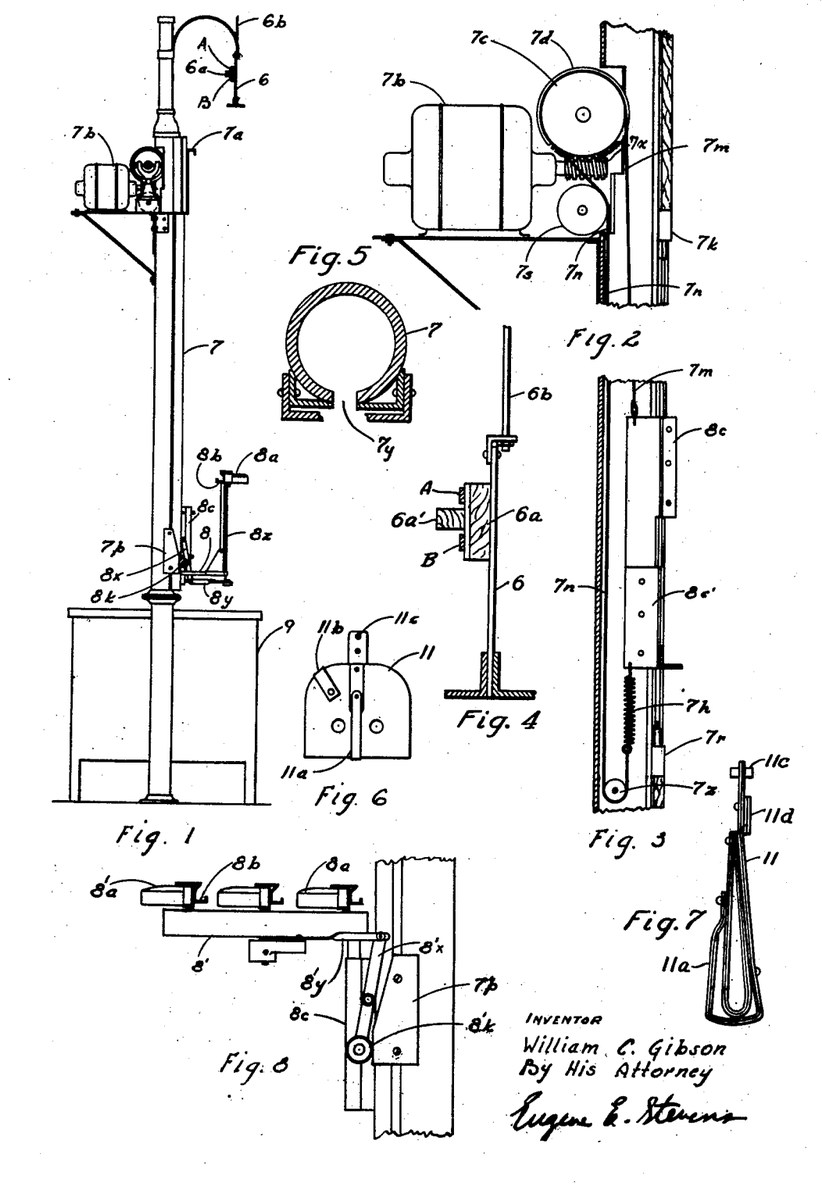
Fig. 1 is a view in elevation of one of the individual stations along the railway line, showing the attendant's desk, the improved elevator-post with its motor set on a shelf near the top thereof and one pick-off and release channel resting at its lowest position near the top of the desk.
Fig. 2 is an enlarged detail in elevation of a side view of the operative motor, showing the connected worm and gearing, also the driving drum and its idler and the new band of steel tape or sprocket chain passing thereover, and a fragment of the post in section showing the hollow inside thereof.
Fig. 3 is a side view in section of a fragment of the lower portion of the elevating hollow post, showing the equipment inside thereof, to which the upper and lower ends of the carrying band are attached and the tension-spring connected therein.
Fig. 4 is a cross sectional view of the new monorail, showing the flat trolley-wires in cross section and the support thereof attached to the side of the rail.
Fig. 5 is a cross section of the hollow elevator-post, showing the broad slot in the front side thereof and the reenforcing ribs on either side of the slot.
Fig. 6 is an elevational view of the new document-holder, showing the folding spring thereon and the elastic-band attached to both sides over the upper corner thereof.
Fig. 7 is a cross sectional view of the document-holder, showing the relative position of the leather pocket, the folding spring and the carrying lugs near the top thereof, that hold the document-holder on the pick-off and release channels, and also the clip on the shank, for hanging the document-holder.
Fig. 8 is an elevational view of a fragment of the elevation-post in the central station, showing the three pick-off and release channels open and resting at their lowest position and mounted on the horizontal carrier arm; the rocking lever and the incline cam that opened said channels being also shown in this figure.
Figure 2:
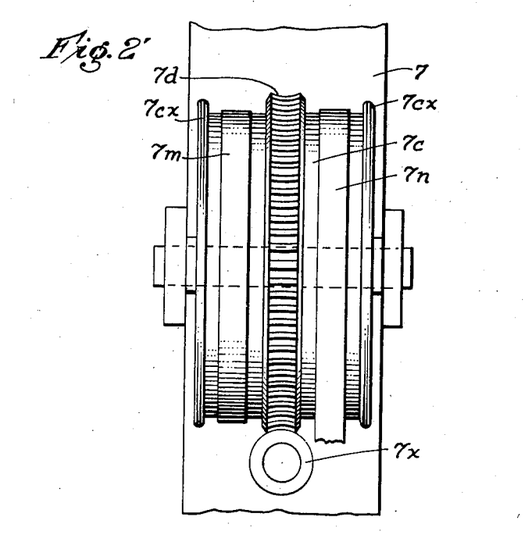
Figure 15:
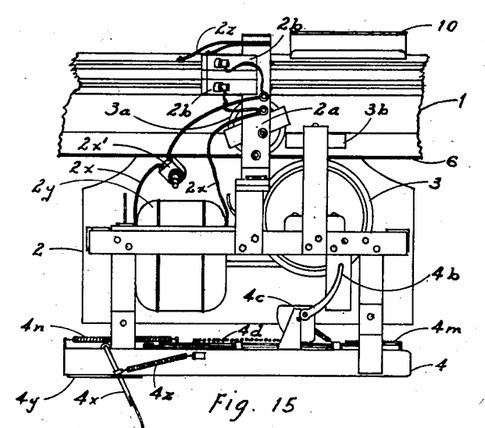
Fig. 15 is a side view in elevation of one of the improved document-conveyor-cars, showing the improved car-post provided with the new spring-pressed trolley-wire contacts and the new double spring that bridges momentarily the two contact-plates that energize the reversing switch of the elevator-motor; the new pick-off and release channels being mounted on a horizontal plate with a part of their new opening and closing equipment thereon. In this figure are also shown the operative motor of the car with its worm-gear and the driving and bracing wheels thereof, as well as a fragment of the monorail on the under side of which said car runs.
Figure 16:
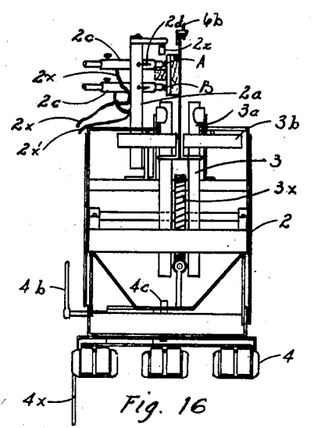
Fig. 16 is an elevational view of the front end of the improved document-conveyor car, showing the worm-gear between the driving wheels, the idle bracing wheels, the new car-post with a front-side view of its two new spring-pressed trolley wire brushes resting on the trolley wires, and an end view of the trailing double spring that bridges momentarily the two contact-plates that energize the reversing switch of the elevator-motor, and the group of three pick-off and release channels on a horizontal plate under the car. In this figure also are shown a cross section of the monorail and of the wooden band fastened thereto; the flat trolley wires being fastened to said wooden band.
Figure 17:
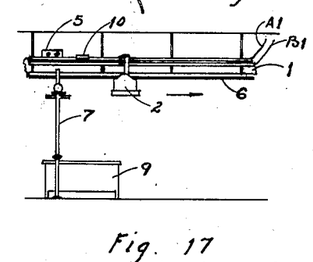
Fig. 17 is an elevational view of a fragment of the endless railway, showing a station-agent's desk and its elevator post, and near it one of the reversing switches and a casing of one of the double contact-plates that are momentarily bridged by the trailing double spring for energizing the reversing switch of the elevator-motor; said reversing switch and said casing being securely installed on the upper edge of the monorail.

In the invention and development of my improved electro - automatic document - collector-and-distributor, I am using an endless railway 1, fragment of which is shown in a side elevational view in Fig. 17, having one rail suspended from the ceiling of the room or from any desirable special structure therefor, not interfering with the normal traffic of the room, and in combination with other coacting appurtenances electrically operative, adapted to collect and distribute automatically various documents and small packages from and to a central station and from and to other designated individual stations along the course of said railway. For operation on said railway, I have designed and constructed a plurality of document-conveyor cars, 2, 2, as shown in Figs. 15 and 16, and provided with various new and more efficient appurtenances than were shown in my former conveyor-cars. For example, the new post 2a of the car is provided with two spring-pressed blocks, 2b, 2b swinging horizontally on pintle-hinges. The two horizontally swinging blocks, 2b, 2b, are installed in a side-mortise cut in the edge of the car-post 2a near the top thereof; and in both Figs. 15 and 16 said blocks are represented in their normal service positions. The pintle-hinges on which said blocks swing are pushed down through a longitudinal boring made in the post 2a from the top thereof down a little way past said installation-mortise. And each of said blocks is provided with a round metal tube 2c horizontally fastened therein, which carries slidingly fitted therein a round carbon brush. These carbon brushes held in place in the tubes with set-screws, rest operatively against the trolley-wires A and B, drawn thereto by means of the helical extension springs, 2d, 2d, attached to the car-post 2a and to each of the swinging blocks, 2b, 2b, taking the electric current from the trolley-wires, A and B and delivering it to the metal tubes, 2c, 2c, which, through connected wires, 2x, 2x', turn the current into the motor 2y of the car 2. The long shaft of the motor 2y is provided on its outer end with a worm which meshes with the worm-gear fixed on the same shaft as the driving wheels, 3, 3, between which it is shown in Fig. 16. Thus the worm and the worm-gear give a predetermined speed to the car. The driving wheels, 3, 3, are provided with rubber tires, which contact the side of the flat bottom of the rail 6, a cross section of which is shown in Fig. 4. And to ensure a firm contact between the rail 6 and the driving wheels, 3, 3, I have installed on rigid brackets in the car a pair of idle bracing wheels, 3a, 3a, provided with rubber tires and adapted to ride on the upper side of the horizontal side-flanges of the rail 6. And, also, for bracing against the side movement of the car along the rail 6, I have installed on rigid brackets in the car a pair of idle rubber-tired horizontal wheels, 3b, 3b, designed to ride on each side of the vertical flange of the rail 6. And for electric current to operate the car, I have installed in a predetermined place near the middle of the car, a rigid post 2a in the upper portion of which I have installed two spring-pressed blocks, 2b, 2b, swinging horizontally on pintle hinges. And each of these blocks, as I have previously explained, is provided with carbon brushes that slide operatively on the flat trolley-wires, A and B and take the electric current therefrom and deliver it to the motor 2y of the car, through the metal tubes, 2c, 2c, and the connected wires, 2x, 2x'. These carbon brushes ride continuously on the trolley-wires A and B.

Said trolley-wires are energized from an adjacent electric source, the supply wires, A1 and B1 are shown in Fig. 17.

Every document-conveyor car on the railway 1 is equipped with three pick-off and release channels, 4, 4, fixed longitudinally, a predetermined distance apart, on a frame attached to the under side of the car. On the front ends of said channels I have installed safety latches, 4a, 4a, attached to a spring-pressed sliding frame and adapted to be opened automatically by means of a spring-pressed lever 4b with its cam 4c and a chain 4d.

*Operation of pick-off and release channels on car*

Figure 13:
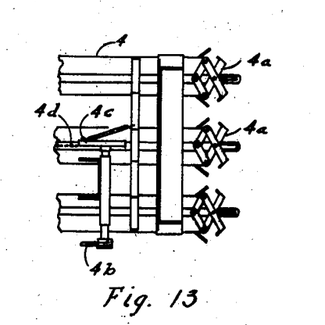
Fig. 13 is a plan view of the group of pick-off and release channels shown in Fig. 12; but in this Figure 13 said channels are all shown open to receive the document-holders from any of the individual stations along the railway; and the opening equipment is herein shown, the parts thereof being shown in their relative positions, as said channels are opened.
Figure 14:
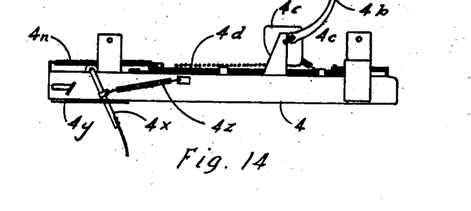
Fig. 14 is a side view in elevation of the group of pick-off and release channels closed, as shown in Fig. 12; a part of the equipment being shown for opening said channels, as the conveyor-car moves along the monorail, past the elevator post.

The pick-off and release channels, 4, 4, fastened on a horizontal frame fixed on the under side of the conveyor-cars, operate automatically in the following way: While the car is moving along the monorail 6 as it is passing the elevator-post of one of the stations on the railway, the lever 4b strikes the tappet-channel 7a fixed at a predetermined height on the inner side of the elevator-post 7. This movement swings the lever 4b backward winding up the chain 4d on the cam 4c, moving the sliding frame 4m forward, thus opening the safety latches, 4a, 4a, as shown in Fig. 13; and, while thus open, these pick-off and release channels 4, 4, pick off from the channels on the elevated brackets at that post any document-holders that the station agent has sent up on his pick-off and release channels 8d and 8a to meet this car.

Figure 9:
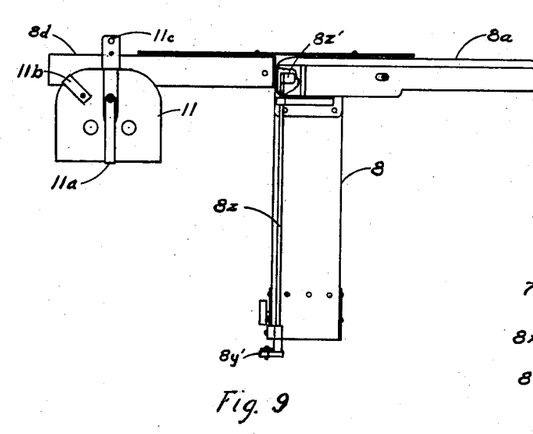
Fig. 9 is an outside view in elevation of the one of the elevator-brackets with its pick-off and release channel mounted thereon; said brackets being of use at the individual stations along the railway line to operate the pick-off and release channels between the moving cars and the attendent's desk.
Figure 10:
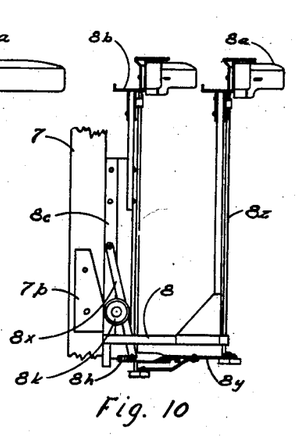
Fig. 10 is a side view in elevation of one of these elevator-brackets, showing two pick-off and release channels mounted thereon open and a fragment of the elevator post; the incline-cam and the swinging arm with its attachments for opening said channels also are shown in this figure.
Figure 11:
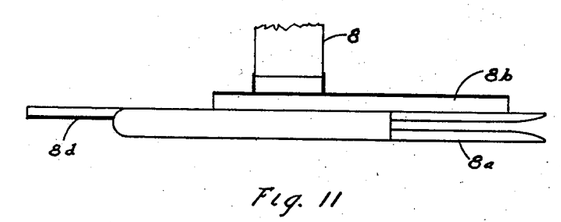
Fig. 11 is a plan view of a fragment of the elevator-bracket and of the upper side of the pick-off and release channel mounted thereon, showing also a top-plan view of the tappet channel fastened thereto.

The pick-off-and-release channels mounted on the brackets 8, 8, on the elevator posts 7, 7, along the railway line, are composed of three parts: 8a the divided channel designed to pick the document-holders 11, 11, off the car-channels 4, 4; the tappet channel designed to contact the lever 4x on the car-channels 4, 4, to open the detaining latches, 4y, 4y at the rear end of the car-channels, 4, 4, so that the document-holders 11, 11, may be released and caught by the divided channel 8a; and the vertical portion 8d of said channels is designed for the station-agent to hang his document-holders on by means of of the clip 11d fixed on the side of the handle thereof, as shown in Fig. 7. In Figs. 9 and 11, the pick-off channels are closed, but in Fig. 10 they are shown open to release all document-holders 11, 11, therein. For the elevator-bracket 8 in Fig. 10 is shown at its lowest place of rest, as indicated by the relative positions of the channel-opening parts.

Figure 12:
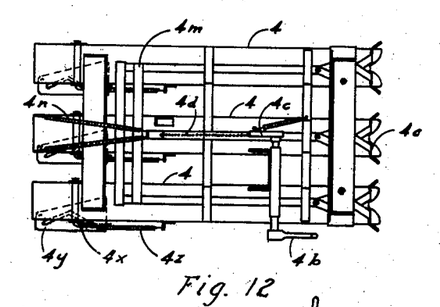
Fig. 12 is a plan view of the upper side of the group of three pick-off and release channels closed and mounted on the under side of each of the conveyor-cars, showing also a part of the equipment for opening said channels to receive the document-holders from the individual stations along the railway and to release said document-holder at certain predetermined stations.

The pick-off and release channels, 4, 4, on the cars have solid tops and sides; but the floorings thereof, all the way through their centers have longitudinal slots wide enough to allow the handles of the document-holders 11d to slide there through; but at the rear ends thereof said slots are provided with adjustable detaining latches, 4y, 4y, shown in Fig. 12, where said latches are shown closed. Said document-holders while sliding through said central slots are supported therein by means of their retaining lugs, 11c, 11c, installed near the tops of said handles, as shown in Figs. 6, 7 and 9. On the front ends of each of these car-channels, 4, 4, I have installed safety-latches, 4a, 4a, to prevent the entrance of said document-holders into said central slots when said latches are closed, as shown in Figs. 12, 14, 15 and 16. Said latches are operated by the sliding frame 4m, all parts of which are above the solid tops of said channels; and when said sliding frame 4m slides forward, the safety-hatches, 4a, 4a, are swung horizontally open by means of the double toggle joint shown in its open position in Fig. 13. Then said car-channels, in passing the station will pick off any document-holders hanging on the elevated pick-off and release channels at any of the stations by allowing said document-holders to enter said central slots in the floorings of said car-channels.

By noting the depth of said car-channels in Fig. 16, it can readily be seen that said car-channels are deep enough to allow the handles of the document-holders, 11, 11, supported on the flooring of said car-channels by means of the retaining transverse lugs, 11c, 11c, installed near the tops thereof, to slide through said channels in the central slots thereof.

Now if there is one or more document-holders on this passing car destined to be left at this designated station, they are hanging in a certain one of the three channels of this car and the corresponding pick-off channel 8a of this station is set on the elevating bracket 8 in line with this certain car-channel 4 and the lever 4x strikes against the tappet-channel 8b and opens the detaining latches, 4y, 4y, of all the channels on the car, and allows said document-holders to be picked off by the pick-off channel 8a of that station. In this way, it is possible to place document-holders in the available pick-off and release channels 8d and 8a at any station to be delivered at any other designation station on the railway line.

*The new elevator mechanism*

To raise the document-holders with the documents from the attendant's desk 9 to the passing cars overhead, I have designed a new type of elevator more economical in construction and more efficient and silent in operation than my former elevator. The construction and operative features of this new type of elevator are shown in Figs. 1, 2 and 3. The elevator-post 7 is a metal tubing with a broad longitudinal slot in the front side thereof, a cross section of which is shown in Fig. 5. In my former elevator mechanism I had the elevator-motor fixed on a shelf near the top of the attendant's desk; but in my new mechanism I have placed the elevator-motor 7b on a shelf near the top of the elevator-post 7. The elevator-motor 7b is a shunt-wound reversible motor; and this motor, in connection with the intermediate electrically operative switches, automatically operates the elevator mechanism of my electro-automatic document-collector-and-distributor. In this elevator mechanism, the new features consist of a rotary drum 7c and a worm-gear 7d mounted on the same shaft; the worm-gear being driven by means of the worm 7x fixed on the outer end of the motor-shaft. The shaft of the drum 7c and the worm-gear 7d are mounted on a bracket fastened on the same shelf with motor 7b. Around the drum 7c I have designed two band-ways provided with a flange along the outer side of each band-way and a flange between them. Over the drum in one of these band-ways, I have wound a strong steel band 7m in one direction and fastened the lower end thereof to the top of a vertically-disposed metal plate 8c adapted to slide up and down in the slot 7y and to carry the elevating bracket 8 with its pick-off and release channels 8a. And over the drum 7c, in the other band-way I have wound another similar steel band 7n in the opposite direction, passing the lower end thereof over the idle band-wheel 7s to direct it into the hollow elevator-post 7, as shown in Fig. 2, and carrying the lower end of the band 7n down under the idle band-wheel 7z and up a short distance to attach it to the lower end of the helical extension spring 7h; the upper end of said spring being attached to a metal plate 8c' fastened to plate 8c, as shown in Fig. 3. The elevating bracket 8 with its pick-off and release channels, 8a, 8a, is fastened to the outer part of the plate 8c, as shown in Fig. 1; and the steel band 7m is adapted to raise said bracket to meet the on-coming conveyor-car. And the steel band 7n is adapted to pull said bracket down to the attendant's desk again, when the elevator motor is reversed. The helical extension spring 7h is designed to keep an operative tension on the steel bands.

The pick-off and release channels 8a on the elevating brackets 8, remain closed and hold the document-holders on their way up to meet the on-coming car, thereby opening the upper limit switch 7k, and exchanging document-holders with said car, then down again to the attendant's desk, until nearly down, thereby opening the lower limit switch 7r, when said channels are automatically opened by means of a mechanism, partly on the elevator-post and partly on the bracket 8. On the post 7 is an incline cam 7p and on the plate 8c is fastened a swinging arm 8x with a roller 8k attached thereto.

On the elevator-bracket 8 is installed a rotary rod 8z shown in Figs. 9 and 10, its lower end journaled in the outer part of the base-plate of said bracket and its upper end journaled in the lower part of said pick-off and release channels mounted on said bracket. On the upper end of said rotary rod, just above the upper journal thereof, I have fixed a cam 8'z adapted when rotated to impinge upon the hinged wing of said channel to open it so that the document-holders therein may be released automatically to drop down. And on the lower end of said rotary rod, just below the lower journal thereof, I have fixed a short crank 8'n. Now along under the base of said bracket, I have installed a reciprocating rod 8y whose forward end engages said short crank in a pintle hinge; and the rear end of said reciprocating rod engages, in a hinge, the lower end of the swinging arm 8x fastened, in a pintle hinge, on the plate 8c, which slides up and down in the slot 7y of the elevator-post 7. And on this swinging arm 8x I have mounted a circular roller 8k. An on the post 7 I have fastened an inclined cam 7p. Now when the bracket 8 is pulled down by means of the elevator-motor 7b and reaches a position opposite the inclined cam 7p, the roller 8k rolls up over the higher part of said cam and thus forces the swinging arm 8x and its connected rod 8y forward; and this movement turns the short crank on the lower end of the rotary rod 8z, rotating said rod far enough to open the hinged wing of said channel to allow the document-holders in the channel to drop to the attendant's desk, as shown in Fig. 1. Now a helical extension spring 8h, shown in Fig. 10, attached to said bracket and to the inner end of the reciprocating rod 8y, closes said channels again to receive other document-holders, as the station-agent raises said bracket slightly, so that the roller 8k leaves said cam.

In Fig. 8 is shown a fragment of the elevator-post 7 with the inclined cam 7p attached thereto, which in the central station is designed to help open the pick-off and release channels of the elevator-bracket 8'. This elevator-bracket 8' in the central station has been made, for the sake of economy, a little different from the brackets, 8, 8, at the way-stations; for, on the bracket 8' there are always three or more pick-off and release channels, according to the number of cars on the railway 1; while, on the way-station brackets, 8, 8, there are always a less number of said channels, depending on the amount of business generally at any designated station.

The pick-off and release channels, 8'a, 8'a, installed on the horizontal carrier-arm of the elevator-bracket 8' are automatically opened in practically the same way as the way-station channels are opened. The rotary opening cams in the central-station channels are all connected in hinges with the inner end of the reciprocating rod 8'y, while the outer end of said rod is connected in a pintle hinge with the upper end of the oscillating arm 8'x which near its middle is attached in a pintle hinge to the plate 8c, a part of the elevator-mechanism that slides up and down in the slot 7y of the elevator-post 7. The lower end of the oscillating arm 8'x is provided with the roller 8'k, which rolls up over the inclined cam 7p as the bracket 8' is pulled down by means of the motor 7b, thus forcing the reciprocating rod 8'y to rotate the cams to open all the central-station channels and allow all the document-holders therein to drop to the station-agent's desk; and a helical extension spring, not shown, attached to said carrier-arm and to the inner end of the reciprocating rod 8'y closes said channels again, to receive other document-holders, as the station-agent raises the bracket 8' slightly, so that the roller 8'k leaves said cam. These pick-off and release channels all carry the tappet-channels, 8b, 8b, same as the channels on the way-station brackets.

In Figs. 1 and 4, the reference character A refers to the flat trolley wire mounted above the bead 6a' on the flexible wooden band 6a fastened to the upper part of the monorail 6; and the reference character B refers to the flat trolley wire mounted on said wooden band below the bead 6a', which separates the trolley wires A and B. And the reference character 6b refers to the steel rod whose lower end is connected to the upper part of the monorail 6, and whose upper end is connected to the ceiling; said rod being one of those adapted to support the railway I. And the reference character I includes the monorail 6 and all the attachments thereof.

On my railway at present, I am operating only three conveyor-cars, as they are ample for the collection and distribution of the documents in our office at the present time. And on the lower part of each of these cars, I have longitudinally fixed three pick-off and release channels, 4, 4, set at equal predetermined distances apart, as shown in Figs. 12 and 16. And on the elevator-brackets, 8, 8, of the way-stations, I have installed one or two pick-off and release channels, 8a, 8a, according to the amount of business at that particular station and these said channels are set in line with the pick-off and release channels, 4, 4, on the cars.

But if we should use four or more cars on this railway line, we should have four or more pick-off and release channels fixed on each of said cars at equal predetermined distances apart. And on each of the elevator-brackets, 8, 8, at the way-stations, we should install one or more pick-off and release channels, 8a, 8a, according to the amount of business at that individual station. And these said channels would be set in line with the four or more pick-off and release channels on said cars. And each of the four or more cars would be provided with the double trailing wires 2z and the contacting ends of said wires would be set at different distances apart to correspond to the distances between the contact plates 10a, 10a, in the flooring 10b of the casing 10, for reversing the elevator-motor at these predetermined way-stations. The station-agents along the railway line are familiar with all these details and can thus send their documents to the central station or to any of the individual way-stations along the railway line, by placing their document-holders in certain pick-off and release channels at their station.

Figure 18:
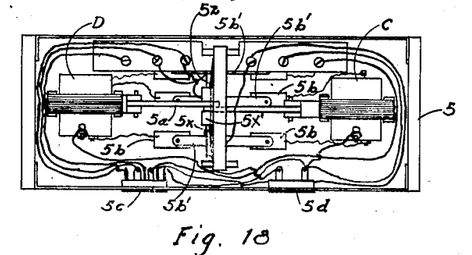
Fig. 18 is a plan view of the inner side of the reversing switch for the elevator-motor, showing the two solenoid motors and the contact plates therein.

In Fig. 18 I have made a plan view of the inside of the reversing switch 5, showing the contact plates on the flooring thereof and their wire connections. The two solenoid motors C and D with their connecting rod 5a; and the operative spring contacts 5b', 5b' and 5b' are also shown in this figure. In service this reversing switch 5 in the box is covered dust-proof and installed on the upper edge of the railway I near the elevator post on either side thereof, as shown in Fig. 17. And for automatically operating this switch 5 in reversing the elevator-motor, I have designed a metal casing 10, 4 or 5 inches long provided with a fibre-flooring 10b well insulated. Transversely across said flooring I have imbedded two bronze contact plates 10a, 10a, at a predetermined distance apart according to the individual station along the railway. And this metal casing being open along the inner side thereof is mounted on the upper edge of the railway I about ten feet away from the elevator post on the fore side thereof to reverse and start the elevator-motor and through the reversing switch to supply current for its upward trip. And another similar metal casing is mounted on the upper edge of the railway I a short distance from said elevator-post on the hinder side thereof to reverse the elevator-motor and through the reversing switch to supply current for its downward trip. This metal casing is shown in Fig. 17 mounted on the upper edge of the railway I.

Figure 20:
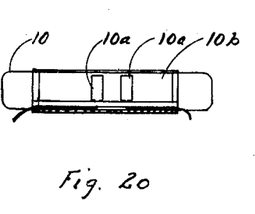
Fig. 20 is a plan view of the flooring of the casing containing the two contact-plates that are momentarily bridged by the double trailing spring fixed on the car-post for energizing the reversing switch of the elevator-motor, showing the two plates imbedded in the flooring of said casing.

In Fig. 15 is shown installed near the top of the car-post 2a a double spring 2z adapted to trail along over the flooring 10b of the metal casing 10 to bridge electrically for a moment the two contact plates 10a, 10a, imbedded in said flooring. In car No. 1, on the railway line, the contacting ends of this double spring 2z are a certain distance apart; and on car No. 2, of the line the contacting ends of this double spring 2z are a different distance apart; and on car No. 3, the contacting ends of this double spring are still a different distance apart. For this car No. 1 will not bridge electrically the contact plates 10a, 10a, at station where car No. 1 is not intended to pick-off nor release documents; and car No. 2 cannot electrically bridge the contact plates, 10a, 10a, intended to be bridged by car No. 3. The attendants at the various stations along the railway I understand these conditions and details of equipment of the cars and the stations on the line, and, consequently, can dispatch their documents correctly to the individual stations at which they intend to send them. The two contact-plates, 10a, 10a, imbedded in the flooring 10b of the metal casing 10 have live electric wires running from them to the solenoids in the reversing switch 5, and the circuit is completed when the double spring 2z momentarily bridges the contact-plates, 10a, 10a. A plan view of the insulated flooring 10b with the two contact-plates, 10a, 10a, imbedded therein is shown in Fig. 20.

In Fig. 15 is shown the manually operative switch 2x'' adapted for cutting the current from the car to stop it on the rail for any purpose, while the other cars are moving normally.

In Fig. 9 of the drawings, I have shown one of the document-holders 11 hanging by means of its clip 11d on the vertical portion 8d of the pick-off and release channel 8a mounted on the elevating bracket 8. This document-holder 11 consists of a folded leather pocket provided with an enclosing spring 11a, an elastic band 11b and a stiff metal shank adapted for hanging the document-holder on the pick-off and release channels. The shank is flat and broad enough to prevent the document-holder from turning or swinging when the station-agent hangs it on said channels to be picked off by the passing cars. Fixed in said shank crosswise, near the top thereof is a double horizontal lug 11c adapted for picking off said document-holder with the pick-off and release channels, 4, 4, of the passing car. Also, fastened to the side of said flat shank, in the upper portion thereof, is a clip 11d adapted for hanging said document-holder over the edge of the vertical portion 8d of the pick-off and release channel 8a mounted on the elevating bracket 8.

In this leather pocket are placed the documents that are intended to be sent to the central station or to some way-station along the railway line. If this document-holder is going to be sent to the central station, it may be hung on the vertical portion 8d of any one of the pick-off and release channels 8a on the elevating bracket 8 of this starting station; but, if this document-holder is intended to be sent to some destined way-station on the line, it must be hung on a certain pick-off and release channel to be delivered at the predetermined station. The agent of every station along the railway 1 is familiar with the peculiar equipment of each of said stations and each of said cars, and consequently, can reach any of said stations with his messages to be delivered thereto.

The document-holder 11, therefore, is hung by means of its clip 11d over the upper edge of the vertical portion 8d of the pick-off and release channel 8a on the elevating bracket 8 at that station-post, to be raised by means of the elevator-motor energized by the next approaching car whose double trailing wires 2z are adapted to energize the reversing switch 5 to reverse the elevator-motor 7b and supply it with the current for the upward trip. And as said car is passing said station-post, it will sweep said document-holder off said pick-off and release channel by means of one of its three pick-off and release channels, 4, 4, and carry it to its predetermined station, where it will be automatically swept off from said car-channel 4 by means of the pick-off and release channel 8a on the raised bracket 8 of said predetermined station. And as said car passes on and reverses the elevator-motor for the downward trip, said document-holder rides down on said channel to be automatically released and dropped on the agent's desk at said predetermined station, as the elevating bracket 8, in its downward trip, approaches its lowest place of rest.

In Fig. 18 it should be noted that the connecting rod 5a is provided with a pintle hinge 5y shown in a dotted line operative between two upper extensions 5'x, 5'x of a fibre yoke 5z, whose movement back and forth, as the solenoids C and D are alternately energized, is supported by means of the two helical springs, 5x, 5x. And on the bottom of the transverse yoke 5z are fixed the three flexible contact-springs, 5b', 5b' that are forced down against the contact-plates 5b, 5b on the fibre floor of the box 5, when the solenoid D is energized, as shown in Fig. 18, thus completing the electric circuits that reverse the elevator-motor and supply it with operative current for its upward trip. And when the solenoid C is energized, the connecting rod 5a is pulled toward the solenoid C, and the yoke 5z also tips toward the solenoid C; and the adjacent ends of the flexible contact-springs, 5b', 5b', are forced down against the adjacent floor-plates, 5b, 5b, thus completing the electric circuits that again reverse the elevator-motor and supply it with operative current for the downward trip.

In Fig. 18', it should be noticed that the rods, 5a, 5a, have their outer ends attached in pintle-hinges to the shanks of the plungers of the solenoids C and D; and that the inner ends of said rods are attached in pintle-hinges to the swinging tumbler yoke 5z. Consequently, when the solenoid C is energized, the tumbler yoke 5z will be quickly pulled towards the solenoid C by means of the rod 5a; and the contacts 5b and 5b' in the right end of the switch-box 5 will be closed. But when the solenoid D is energized, the tumbler yoke 5z will be quickly pulled towards the solenoid D by means of the rod 5a; and the contacts 5b and 5b' in the left end of the switch-box 5 will be closed.

Analysis of the diagrammatic representation of the electric circuits involved in the automatic operation of the elevator mechanism shown in Figs. 1, 2, 3, 17, 18, 19 and 20 follows. Said diagrammatic representation of said circuits shows the connection of the elevator-motor, the reversing switches, the solenoids, the limiting switches and the momentary contacts for the operation of the elevator-motor in connection with the electro-automatic document collector and distributor.

Figure 19:
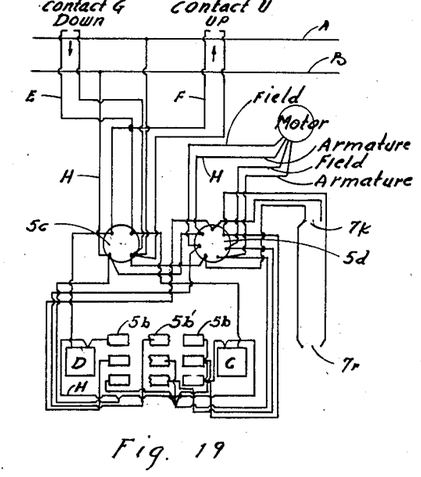
Fig. 19 is a plan view of the diagrammatic representation of the electric circuits involved in the automatic operation of the elevator-mechanism of said electro-automatic document collector and distributor.

Circuit H from the trolley-wire B connects with solenoid D and running to the reversing switch and the armature and then on, to the opposite end of the reversing switch; then through the reversing switch to the elevator-motor.

Trolley-wire A and circuits F and E are of the same polarity and operate as follows:

Car on monorail, moving to the left closes the momentary-contact U on the circuit F to the solenoid D, throwing the reversing switch into position to supply current for the up-trip, until the upper limit switch 7k is opened, which stops the elevator-motor near the top of the station-post. After the car passes the station, it closes the momentary-contact G, which puts the current in the solenoid C, causing the reversing switch to reverse the motor for the downward trip until the lower limit switch 7r is opened.

Thus, it can readily be seen that I have designed and developed an efficient electro-automatic document collector and distributor for use in offices and salesrooms. But in the description of my new and useful electro-automatic document collector and distributor for offices and salesrooms and other places, as set forth in the foregoing specification, it should be well understood that the specific detail of the various parts of the instant embodiment of my present invention, as I have illustrated in the drawings thereof and fully described, are not to be considered as limitations in the construction of my new device; and that while keeping within the scope of my invention and claims, I may make desirable modifications in these details to facilitate quantity-production or to economize in the fabrication of the parts thereof, provided I keep within the spirit and scope of my invention and claims.

Now, having thus described the various features of my new invention, the detail construction, arrangement and combination of its parts, as well as their functions and the ways and means of assemblage, operation and application; those features and accessories of my new device for the electro-automatic document collector and distributor, on which I desire Letters Patent granted to me, I have set forth specifically in the following claims.

I claim:

1. In an electro-automatic document collector and distributor of the kind described, a station elevator-mechanism consisting of a hollow post provided with a broad longitudinal slot in the front side and a shelf on the backside near the top thereof; a reversible electric motor on said shelf, adapted to drive a rotary drum at a predetermined speed by means of a worm and a worm-gear set on the same shaft as said drum, said shaft being installed in a rigid bracket fixed on the same shelf with said motor; two flanged band-ways around the perimeter of said drum; a vertically-disposed plate designed to fit said broad slot and to slide easily up and down therein, said plate being adapted to support an elevator-bracket; station pick-off and release channels mounted on the upper end of said elevator-bracket, said channels when closed being adapted to carry document-holders; means for opening said pick-off and release channels, so that said document-holders may drop down; a strong steel band wound in one direction around one of said band-ways on said drum and having its lower end extending down into said hollow post and attached to the upper portion of said vertically-disposed plate, said band being designed in service to raise said plate and its attached elevator-bracket; means for bringing said elevator-bracket down again to the station-agent's desk; limit-switches fixed in the upper and the lower portions of said post, adapted to cut the current from the motor to stop it at the end of said bracket's trip; and means for reversing said motor and supplying it with its operative current for pulling said bracket up and down between said desk and said conveyor-cars.

2. In an electro-automatic document collector and distributor of the kind described and defined in claim 1, including a document-holder consisting of a leather pocket provided with an enclosing spring and an elastic band fastened over an upper corner thereof; a stiff, broad shank extending beyond the upper edge of said pocket; a double horizontal lug fixed crosswise through said shank near the top thereof; and a clip fastened to the side of said broad shank in the upper portion thereof and designed for the purpose of hanging said document-holder on the edge of the vertical portion of the pick-off and release channel mounted on said elevator-bracket.

3. In an electro-automatic document collector and distributor of the character described, according to claim 1, including an electrically-operative reversing switch consisting of an oblong rectangular dust-proof box provided with a fibre-covered flooring having a plurality of electric contact-plates fixed thereon in predetermined places, each plate being wired to its predetermined connection for reversing the elevator-motor and supplying it with current for its trip; a solenoid motor in either end of said box, with their plungers connected by means of a hinged reciprocating rod, said solenoids being designed to be momentarily energized alternately; a fibre yoke attached across the under part of said rod; a plurality of flexible contact springs fixed on the under side of said yoke and adapted to correspond in number and position with the contact plates on said fibre flooring, said springs being wired to their predetermined connections, to reverse the elevator-motor and supply it with current for the up trip when one of the solenoids is energized and to reverse the elevator-motor and supply it with current for the down trip when the other solenoid is energized; and two helical extension springs connected with said box and said yoke to support the yoke in either position as said solenoids are alternately energized.

WILLIAM C. GIBSON.